Nov. 21, 1933.  R. H. MAUTSCH  1,935,806
REMOTE CONTROL MECHANISM
Filed Feb. 13, 1932
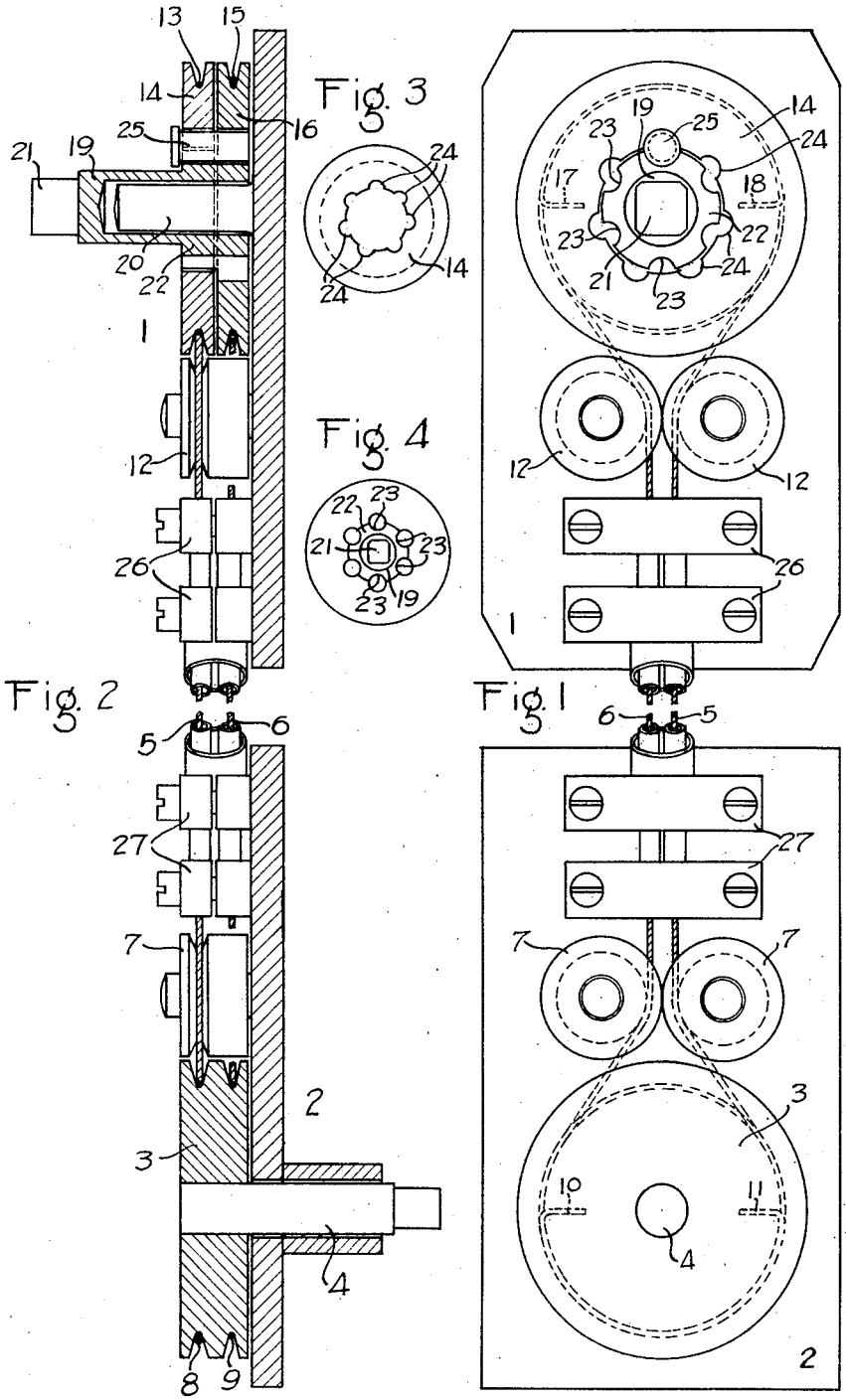
INVENTOR
ROBERT HENRI MAUTSCH.
BY Wm. M. Cady
ATTORNEY Patented Nov. 21, 1933

1,935,806

UNITED STATES PATENT OFFICE 1,935,806

REMOTE CONTROL MECHANISM

Robert Henri Mautsch, Brussels, Belgium, assignor to The Westinghouse Air Brake Company, Wilmerding, Pa., a corporation of Pennsylvania Application February 13, 1932, Serial No. 592,835, and in France November 18, 1931

3 Claims. (Cl. 74—21)

This invention relates to remote control mechanism comprising flexible wire or cable transmission of the Bowden or other type connecting a rotatable control device and the device to be controlled and has for its object to provide arrangements for enabling the tension of the transmission wires to be accurately and readily adjusted. According to the principal feature of the invention each wire of the transmission mechanism is secured at one end of the transmission to a separate pulley or its equivalent, the two pulleys being adapted to be rotated relative to one another in opposite directions until the desired tension in the wires is attained and then secured together so as to maintain this tension.

In a preferred form of the invention the two pulleys are arranged to be secured together by means of a pin or peg traversing apertures or recesses formed in both pulleys, the number of apertures in one pulley being different from the number of apertures in the other so as to permit a relatively fine adjustment of the relative positions of the pulleys.

The invention is illustrated by way of example in the accompanying drawing, Figs. 1 and 2 of which are views in front and sectional side elevation, respectively, of one form of control mechanism embodying the invention, Figs. 3 and 4 being front views of the two pulleys shown in the upper part of Figs. 1 and 2.

Referring now to the drawing it will be seen that the manually operated control device is indicated at 1 and the device to be controlled at 2. The latter comprises a pulley 3 mounted upon a rotatable spindle 4. The devices 1 and 2 are connected by a pair of transmission wires 5, 6 which at the device 2 pass around guide pulleys 7 and grooves 8, 9 in the pulley 3 the extreme ends of the wires 5, 6 being secured to the pulley as indicated at 10, 11.

At the device 1, the wires 5, 6, pass around guide pulleys 12, the wire 5 passing around a groove 13 in a pulley 14 and the wire 6 passing around a groove 15 in a pulley 16. The extreme ends of the wires 5, 6, are secured to the pulleys 14 and 16 as indicated at 17, 18 in Fig. 1.

The pulley 16 is secured to or formed integral with a hollow stem 19 rotatably mounted upon a fixed pivot 20, the outer end of the stem 19 being provided with a head 21 of square cross-section upon which a control handle (not shown) is arranged to be mounted.

The stem 19 is provided with a cylindrical extension 22 on which the pulley 14 is rotatably mounted and the outer surface of the extension 22 is provided with a number of equally spaced semi-cylindrical recesses or grooves 23. The corresponding inner surface of the pulley 14 is provided with a number of similar equally spaced grooves or recesses 24. In the construction illustrated there are six recesses 23 in the extension 22 and seven recesses 24 in the pulley 14 and the latter is arranged to be secured to the extension 22 by means of a pin or peg 25 inserted in a pair of apertures 23, 24, which are in alignment with one another thereby securing the pulleys 14, 16, to each other.

The sheaths or outer covering of the transmission wires 5, 6, are secured in position and protected at each end by clamps or clips as indicated at 26, 27.

In operation, it will be understood that the rotation of the stem 19 of the device 1 by means of the control handle will effect the rotation of the pulleys 14, 16 and will thus cause the transmission wires 5, 6, to move in opposite directions. At the device 2, this movement of the wires 5, 6, will effect a corresponding rotation of the pulley 3 and the spindle 4 of the device to be controlled.

When it is desired to adjust the tension of the wires 5, 6, the pin 25 is withdrawn and the pulleys 14, 16 are rotated relative to one another in opposite directions until another pair of the grooves 23, 24, in the stem extension 22 and the pulley 14 come into alignment with one another and the pin 25 is then inserted into the cylindrical cavity formed by these aligned grooves.

It will be appreciated that since there are six recesses 23 in the extension 22 and seven recesses 24 in the pulley 14, it is only necessary to rotate the pulleys 14, 16 through an angular distance equal to one forty-second of a complete revolution in order to obtain the next successive alignment of two grooves as above described so that a relatively fine adjustment can be obtained with only a small number of grooves in the extension 22 and the pulley 14.

The pulley 3 may evidently be of the same or different diameter relative to the pulleys 14, 16 according to the speed ratio between the rotations of the devices 1, 2, which is desired.

The invention is capable of being applied to all cases in which a control device and a device to be controlled are coupled together by a flexible transmission and is particularly useful in connection with the distant control of the steam admission valve of steam heating apparatus for railway vehicles and the like.

Having now described my invention, what I claim as new and desire to secure by Letters Patent, is:

1. In a remote control mechanism, a driven pulley, a flexible transmission means for operating said pulley, a pair of associated pulleys, to each of which said means is secured, and adapted to be relatively adjusted to tension said means, and means for locking said associated pulleys in their adjusted position.

2. In a remote control mechanism, a driven pulley, a flexible transmission means for operating said pulley, a pair of associated pulleys, to each of which said means is secured, and adapted to be relatively adjusted to tension said means, means for locking said associated pulleys in their adjusted position, and means for rotating said associated pulleys to cause said flexible transmission means to operate said driven pulley.

3. A flexible cable transmission mechanism comprising a flexible cable means, a pair of pulleys mounted to rotate on the same axis in the same direction and adapted to be relatively rotated in opposite directions, said cable means having two ends, one secured to one pulley and the other to the other pulley, said pulleys having openings adapted to align upon relative rotation of said pulleys, and a pin for engagement in said aligned openings to prevent relative rotation of said pulleys.

ROBERT HENRI MAUTSCH.